(12) United States Patent
Frederick

(10) Patent No.: US 9,031,820 B2
(45) Date of Patent: May 12, 2015

(54) METHOD FOR CREATING A 3D MODEL OF A HYDROCARBON RESERVOIR, AND METHOD FOR COMPARATIVE TESTING OF HYDROCARBON RECOVERY TECHNIQUES

(75) Inventor: Lawrence Frederick, Calgary (CA)

(73) Assignee: Husky Oil Operations Limited, Calgary, Alberta (CA)

( * ) Notice: Subject to any disclaimer, the term of this patent is extended or adjusted under 35 U.S.C. 154(b) by 315 days.

(21) Appl. No.: 13/353,182

(22) Filed: Jan. 18, 2012

(65) Prior Publication Data

US 2013/0180327 A1    Jul. 18, 2013

(30) Foreign Application Priority Data

Jan. 16, 2012 (CA) .................................... 2764539

(51) Int. Cl.
*G06G 7/48* (2006.01)
*B29C 67/00* (2006.01)
*E21B 43/00* (2006.01)

(52) U.S. Cl.
CPC ............ *B29C 67/0059* (2013.01); *E21B 43/00* (2013.01)

(58) Field of Classification Search
CPC ............ G01V 1/34; G01V 1/364; B09C 1/02; B09C 1/06; C10G 9/24; E21B 17/028; E21B 43/168; E21B 43/24; E21B 43/2401
See application file for complete search history.

(56) References Cited

U.S. PATENT DOCUMENTS

| | | | | |
|---|---|---|---|---|
| 7,461,691 B2 * | 12/2008 | Vinegar et al. | ................... | 166/60 |
| 7,783,462 B2 * | 8/2010 | Landis et al. | ................... | 703/10 |
| 7,840,394 B2 * | 11/2010 | Madatov et al. | ................ | 703/10 |
| 8,275,593 B2 * | 9/2012 | Zhao | ............................... | 703/10 |
| 2003/0201098 A1 * | 10/2003 | Karanikas et al. | .............. | 166/53 |
| 2009/0010104 A1 * | 1/2009 | Leaney | ........................... | 367/47 |
| 2009/0043507 A1 * | 2/2009 | Dommisse et al. | ............... | 702/6 |
| 2010/0185428 A1 * | 7/2010 | Vink | ................................ | 703/10 |
| 2011/0054857 A1 * | 3/2011 | Moguchaya | ...................... | 703/2 |
| 2011/0320182 A1 * | 12/2011 | Dommisse et al. | ............. | 703/10 |

OTHER PUBLICATIONS

Silva et al. ("Integration of 3D Seismic Data Into Reservoir Models Using Geostatistics",Socitey of Petroleum Engineers, 1996, pp. 490-495).*
Tunio et al.("Comparison of Different Enhanced Oil Recovery Techniques for Better Oil Productivity", International Journal of Applied Science and Technology,2011,pp. 143-153).*

(Continued)

*Primary Examiner* — Omar Fernandez Rivas
*Assistant Examiner* — Iftekhar Khan
(74) *Attorney, Agent, or Firm* — Frost Brown Todd LLC

(57) ABSTRACT

A method of modelling a hydrocarbon-containing reservoir which is representative of such reservoir in at least one physical characteristic such as reservoir porosity or permeability. Data, such as reservoir porosity is firstly determined. Such data is then transformed into printing instructions for a 3D printer. The 3D printer is used to print a reduced-scale model which is representative of the reservoir in respect of the at least one physical characteristic, such as reservoir porosity. A method of comparative testing of different hydrocarbon recovery techniques on a single hydrocarbon-containing reservoir is also disclosed and claimed.

13 Claims, 6 Drawing Sheets

(56) References Cited

OTHER PUBLICATIONS

Toutaoui et al. ("Rapid Prototyping Technology—New Potentials for Offshore and Abyssal Engineering", Proceedings of the Thirteenth (2003) International Offshore and Polar Engineering Conference, May 25-30, 2003).*

Ryes et al., "Cyber Techniques Used to Produce Physical Geological Models" 2008 Joint Meeting of the Geological Society of America, et al., Geological Society of America "Abstracts with Programs", vol. 40, No. 6, p. 136, 2008, https://webspace.utexas.edu/reyesr/publications/gsa2008.html.

* cited by examiner

METHOD FOR CREATING A 3D MODEL OF A HYDROCARBON RESERVOIR, AND METHOD FOR COMPARATIVE TESTING OF HYDROCARBON RECOVERY TECHNIQUES

FIELD OF THE INVENTION

The present invention broadly relates to a method for modeling a hydrocarbon reservoir, and more particularly to a method for creating a physical three dimensional model of a hydrocarbon-containing reservoir having one or more physical characteristics of the formation.

BACKGROUND OF THE INVENTION

Various techniques currently exist for recovery of viscous oil from underground deposits, including recovery of oil from within oil sand and oil carbonate formations which may have a "pay" zone in the range of between 15 m to 200 m thickness, typically commencing 20-500 m beneath the surface.

One such recovery technique is the so-called SAGD technique ("Steam Assisted Gravity Drainage"), such as disclosed in U.S. Pat. No. 5,273,111 to Brannan et al, 1993), which uses an upper and lower pair of vertically-aligned horizontal wells drilled into a "pay" zone. Heated steam is injected into the upper well of such pair of horizontal wells, and thereby into the formation, heating oil within the formation and thereby reducing its viscosity, which heated oil then drains downwardly in the formation and is drawn into and recovered to surface via the lower well of the well pair.

Other recovery techniques utilize in situ combustion of a portion of oil within the formation, wherein an advancing combustion front fuelled by a portion of the oil in the formation heats remaining oil thereby reducing its viscosity, which heated oil is then collected via a horizontal collector well placed low in the formation. An air injector well is used to inject air into the formation and supply air to the combustion front. Two such in situ combustion recovery methods can be found respectively in U.S. Pat. No. 5,626,191 and U.S. Pat. No. 7,841,404. Many other combinations and techniques have been used in the prior art for recovery of oil from oil formations.

Commerically-available computer modelling programs exist for experimentally modelling and predicting the cumulative oil recovery over time from an oil reservoir using a particular oil recovery method, as a means of studying and attempting to determine the most effective method for recovery of oil from a formation.

For example, a number of such computer simulation reservoir modelling software programs which presently exist are as follows:

(i) STARS[1] (Steam, Thermal, and Advanced Processes Reservoir Simulator) reservoir modelling software, available from Computer Modeling Group, Ltd., Calgary, Alberta, Canada,

[1] Trademark of Computer Modeling Group, Ltd., Calgary, Alberta, for reservoir modelling software (ii) VIP[2] reservoir modelling software, available from Landmark Graphics Corporation,

[2] Trademark of Landmark Graphics Corporation for reservoir modelling software (iii) ECLIPSE[3] reservoir modelling software, available from Schlumberger Corp.

[3] Trademark of Schlumberger Corp. for reservoir modelling software

In utilizing such reservoir modelling software, the reservoir properties (which may be obtained from core samples or vertical well logs from wells drilled at various locations in the formation, and which can include geologic data, spectral density log (SDL) data, as well as seismic data, may be input into some of such computer modelling software For example, such reservoir properties, may be, for one computer model of a hydrocarbon formation, as follows:

| Parameter | Units | Illustrative Value |
|---|---|---|
| Reservoir Properties | | |
| Pay thickness | m | 30 |
| Porosity | % | 30 |
| Oil saturation | % | 75 |
| Water saturation | % | 20 |
| Gas saturation | fraction | 5 |
| Horizontal. Permeability of formation | mD | 5000 |
| Vertical Permeability of formation | mD | 3400 |
| Reservoir pressure | kPa | 3000 |
| Rock compressibility | /kPa | $5 \times 10^6$ |
| Conductivity | J/m K | $3.2 \times 10^5$ |
| Rock Heat capacity | $J/m^3$ K | $2.5 \times 10^6$ |
| Oil Properties | | |
| Density | $kg/m^3$ | 1009 |
| Viscosity, dead oil @ 20 C. | cP | 500,000 |
| Average molecular weight oil | AMU | 598 |
| Compressibility | /kPa | 1.06E+3 |

The geological properties are typically entered into geological modelling software such as Petrel™, available from Schlumberger Corp., or Earthmodel™ available from Forgo-Jason. These geological models are typically "upscaled" by combining grid blocks for use in the computer simulation reservoir modelling software.

Seismic data may also be collected by placing an array of hydrophones and geophones at selected locations on the surface of the reservoir, or seismic may be collected on a real-time basis using geophones placed in wells, and are collected over time (known in the industry as 4D seismic). The obtained seismic data may be processed using software programs such as Seisworks and Earthcube available from Landmark Graphics Corp., to obtain hydrocarbon indicators, stratigraphy, and structure useful for computer modelling of hydrocarbon formations undergoing exploitation using one of the several recovery methods including SAGD or in situ combustion.

As noted, for example in US Pub. 20070168170, the log data, core data, and SDL data can be pre-processed using computer programs such as Petroworks[4] available from Landmark Graphics Corporation, Prizm[5] available from Geographix Inc. (now LMKR Canada Inc.), or DPP[6] available from Halliburton, to obtain water and oil saturations, porosity, and clay content of a particular formation.

[4] Trademark of Landmark Graphics Corp. for well data pre-processing computer software
[5] Trademark of LMKR Canada Inc. for well data pre-processing computer software
[6] Trademark of Halliburton Energy Services Inc. for well data pre-processing computer software Disadvantageously, however, computer reservoir modelling software (depending on its sophistication and the amount of formation data which may be input) nonetheless cannot entirely predict reservoir performance using various different recovery techniques. Particularly in the case of carbonate reservoirs, such reservoirs are often difficult to model via computer software models. Specifically, carbonate reservoirs have complex and heterogeneous geological and petrophysical characteristics. They are often naturally fractured, and exhibit complex porosity systems and wetability characteristics, which influence drastically their multi-phase flow properties.

Accordingly, there is always some level of disparity of the computer simulated model, as compared to actual results which are ultimately attained in the real-life performance of a physical reservoir. The level of disparity can sometimes be significant, particularly in the case of carbonate reservoirs.

Moreover, real-life reservoirs are each unique in regard to various physical parameters thereof. Due to the permanent change invoked on a real-life reservoir once a single oil recovery method is tested thereon, it is impossible to thereafter conduct a further test on such identical formation, using a different method, to determine which method is better. Such uniqueness and irrevocable changes inflicted on a reservoir when using a particular recovery technique to date has prevented effective comparison of different oil recovery techniques on an individual reservoir on an "apples to apples" basis.

Thus a real need exists in the industry for more accurate and reliable reservoir performance prediction means which better allows for comparison of and optimization of oil recovery techniques from a hydrocarbon reservoir/formation, without having to incur the time and significant expense in physically testing recovery techniques on a real-life reservoirs, and being able to compare recovery techniques on an "apples to apples" basis with regard to the same reservoir.

SUMMARY OF THE INVENTION

Three dimensional printing, alternatively referred to as "rapid prototyping", has been conducted for a number of years using ceramic powders. A printer head, which may comprise a number of inkjet printer heads, lays down a layer of binder in a given location, which solidifies the ceramic powder in such location. After each pass of the printer head, the build space is moved up, a layer of ceramic powder laid down, and another pass of the printer head is made. Such process is repeated many times, and after many subsequent repetitions, results in a 3D article supported in place by powder where such powder has not had binder added to it. The "unbound" powder may then be removed, leaving the remaining article.

Three dimensional (hereinafter "3D") representations of detailed components/parts may be "printed" from digital computer files, such as a CAD files describing such part. Such a 3D representation (actual size, or to scale) may be created using a liquid polymer and a high-resolution Digital Light Processor (DLP) projector, whose light emitted therefrom solidifies a liquid photopolymer, resulting in durable plastic part that mimics injection moulding for accuracy, material properties, detail, and surface finish.

3D "printed" component models are useful, of course, for their appearance and for use in determining part clearances, access for purpose of servicing, or the like. Typically the model created is of a homogeneous material, such as a ceramic or rubberized compound, which may be intended to represent an actual say metallic part and may be coloured in various hues to signify different materials, but the material itself is generally homogeneous throughout.

In another aspect of prior art 3D printing as used by 3D printers made by Z Corporation of Tokyo, Japan and as suggested on such company's web site, 3D printing may be used to show ground contours in three dimensions. Such printed 3D models may be prepared from satellite images using LIDAR and/or infrared image data.

Again, the material composition of the individual modelled (printed) contour, which material may be of a plastic or rubberized compound, does not and is not intended to be of the same material composition of the actual part or component, but merely acts as a model in terms of appearance.

Similarly, colour-coded 3D printed representations of underground formations have been suggested on web sites of Z Corporation, as a means to visualize the geological make up of a subsurface formation, with different colours representing different geology or strata (eg. light yellow representing limestone formation, darker red representing igneous rock, for example). Again, such 3D printed model in terms of its physical make up is typically a homogeneous rubber-like material, and such model clearly does not emulate the actual physical geology of the formation.

3D ceramic printers have been employed in the prior art, wherein the 3D printer prints clay from its nozzle, which ceramic component can then be placed in a kiln and fired to form a desired part. The 3D printer uses powder clay which is mixed with water and printed out using a syringe. Again, due to printing out the clay uniformly when printing the 3D structure/component, the composition of the resultant printed 3D structure, is homogeneous.

Furthermore, as disclosed on the website of Z Corporation, a 3D component may be printed, using proprietary compounds of comprising a powder and binder which is adapted for infiltration with an elastomer to thereby create parts with rubber-like properties. The material consists of a mix of cellulose, specialty fibers, and other additives that combine to provide an accurate part capable of absorbing the elastomer, which gives the parts their rubber-like properties. Again, however, the resultant part is of a homogeneous composition, namely rubberized throughout due to infusion of the elastomer into the printed part.

The present invention, in one broad novel aspect thereof, relates to a novel method of using a 3D printer to print a scaled model of an underground hydrocarbon-containing reservoir, which printed 3D model is actually representative as to at least one physical characteristic of such underground reservoir, which in a preferred embodiment may have further printed within such scaler model various wells, which may be primarily using a heated metal to represent such walls with the scaler model.

More particularly, the present invention relates to a method of using a 3D printer to print a scale model of an underground hydrocarbon-containing reservoir, such as an oil, gas, or oil-sand containing reservoir, which printed 3D model is actually representative as to at least one physically characteristic of such formation throughout the reservoir or a portion of the reservoir/formation, namely an important physical characteristic such as the reservoir's porosity, its permeability, differences in matrix and fracture systems, its geology in terms of its fractures/faults, salt domes, or the like, its oil saturation, its water saturation, clay type and content, tests and simulations, its thermal conductivity, grain size, cementation, its heat capacity of rock/sand therewithin, or a combination of two or more of the foregoing physical characteristics.

The physical characteristics of the formation to be emulated are those characteristics determined from actual physical analysis and data derived from the formation itself, such as from 3D seismic data and/or from core sample data/analysis obtained from various test wells drilled in the formation and reservoir engineering determinations from well tests and simulations.

In accordance with a further embodiment of the method of the present invention, printed 3D scaled model of such underground formation, once such 3D model is formed, may then be physically tested relatively inexpensively, as opposed to having to otherwise conduct actual physical tests of the method on the formation itself. The testing of various oil recovery methods on the scaled model of the formation may conducted inexpensively and cheaply, using for example a testing apparatus such as described in U.S. Pat. No. 5,626,191, in order to obtain physical test data to assist in determining the likely success or non-success of a particular method of oil recovery from such a particular formation having those particular characteristics.

Advantageously, not only is a real cost savings achieved in creating a scaled 3D model in accordance with the method of the present invention by not having to drill, for example SAGD wells in an actual test formation before being able to determine if a SAGD method of recovery is satisfactory for a particular hydrocarbon formation, but a further advantage is achieved in being able to create a plurality of identical 3D models and employ alternate methods of recovery for each of the created identical 3D models, so as to then be able to comparatively select the best manner of oil recovery suited for that particular hydrocarbon formation having those particular physical characteristics. In other words, an optimization process may be carried out, in that a particular method may be chosen after a number of methods have been tried on identical 3D models of the same reservoir, which method accordingly has been optimized and is best suited to provide the quickest and/or greatest oil recovery at the least for acceptable) cost, from the formation.

Accordingly, in a first broad aspect of the method of the present invention, such method comprises a method of creating a scale or reduced-scale model of a reservoir or a portion of such reservoir that is representative of that portion of the reservoir in terms of at least one or more of that portion of the reservoir's physical characteristics, comprising the steps of:

(i) acquiring physical data of said reservoir or portion of said reservoir as to one or more physical characteristics of said reservoir selected from the group of reservoir physical characteristics consisting of reservoir porosity, reservoir permeability, reservoir heterogeneities, reservoir wetability, reservoir geology in terms of its fracture lines and faults, reservoir oil saturation, reservoir fluid saturations, oil and/or water saturations, reservoir thermal conductivity, and reservoir heat capacity, at a single or plurality of substantially evenly-dispersed locations throughout the reservoir or a portion of the reservoir;

(ii) transforming said physical data into printing instructions for a three dimensional printer to permit said printer to print a reduced scale, three dimensional scalar model representative of said reservoir or portion of said reservoir in said at least one physical characteristic; and (iv) printing said scalar model of said reservoir using said three dimensional printer so as to form said scalar model representative of said reservoir in said at least one physical characteristic.

In a further refinement, the scaler or reduced-scale model is further flooded with a fluid having a viscosity representative of oil found within the formation, optionally under pressure in order to move the fluid into pores created within the scalar model.

The fluid with which the model is flooded may be a fluid having a viscosity equal to, or lower, than the viscosity of oil in the actual formation. Specifically, if creating a reduced scale model, the pores in the reduced scale model will likewise be smaller in size as compared to the actual pores existing in the reservoir. Accordingly, to actually mimic the true flow of fluid such as oil or water in the reservoir, the fluid with which the model is flooded will typically be of a lower viscosity (ie more flowable) than oil (at a give temperature) which exists in the actual formation, so that such fluid will flow within the scalar model and its smaller pores in a manner as closely representative as possible to the true migration of oil or fluid in the actual reservoir when oil recovery techniques are used.

Alternatively, or in addition, the flooded scalar model may be subject to pressure and/or temperature to more completely and/or more quickly infuse the fluid into interstitial pores created in the scalar model representative of pores existing in the actual reservoir itself.

In a further preferred step where water exists in the actual reservoir, the fluid in said scalar model is displaced with saline water or saline water may be infused into the model, at one or more locations, to mimic initial water in place in said actual reservoir.

The amount of scalar reduction of actual reservoir or the portion of the reservoir to the reduced scale model is dependent on the printer resolution by which the 3D printer is capable of resolving. Stated in another manner, for a given 3D printer resolution, the largest volume of a formation which may be accurately modelled as to pore size will be limited. Should the actual reservoir size be larger in the limited volume, then only a portion of such reservoir may be modelled using the present invention.

For example, printer resolution of a current state-of-the-art 3D printer may be in the order of 0.0001 inches (ie 0.000000254 m), or approximately $2\times10^{-7}$ m, namely 0.2 microns. Accordingly, the smallest pore size volume that can be printed by the 3D printer is $(2\times10^{-7})^3$ $m^3$, namely $8\times10^{-21}$ $m^3$. Accordingly, if the smallest pore size in an actual formation, typically a carbonate formation, is 1 cubic micron (ie $1\times10^{-6})^3$ namely $1\times10^{-16}$ $m^3$, then the smallest scalar reduction of reservoir volume, if that reservoir is desired to be accurately modelled in the scalar model, can only be $8\times10^{-21}/1\times10^{-18}$, namely 1/125 of true size.

Thus, for an actual reservoir or portion of an actual reservoir having dimensions of 100 m×40 m×15 m (namely length×width×depth), which depth is typical of oil sand deposits where the depth of the "pay" seam is only in the range of some 15-200 m and where the size of the smallest pore within such formation may be 1 cubic micron existing between oil sand grains, the smallest size of the 3D printer that would be needed to print a representative reduced-size scalar model of such formation would be a 3D printer capable of printing a representative model having the following dimensions, namely 20 m×8 m×3 m, namely a volume 1/125 that of the actual reservoir or portion thereof being modelled.

As may be seen from the above, the greater the printable resolution of the 3D printer, the smaller the model that may be made, or alternatively the greater the volume of the actual hydrocarbon-containing reservoir that may be realistically modelled from a model of a fixed size.

In a further embodiment of the method of the present invention, such method comprises a process which allows optimization of oil recovery techniques through physical comparison of such oil recovery techniques, namely comparison as to the effectiveness of two different oil recovery techniques on the identical formation, to allow selection of the better of the two oil recovery techniques for the given formation.

Accordingly, in a further preferred embodiment of the method of the present invention, such method comprises a process for comparative testing of different methods of oil recovery from a hydrocarbon-containing reservoir, comprising the steps of:

(i) acquiring physical data of said reservoir or portion of said reservoir as to one or more physical characteristics of said reservoir selected from the group of reservoir physical characteristics consisting of reservoir porosity, reservoir heterogeneities, reservoir permeability, reservoir wetability, reservoir geology in terms of its fracture lines and faults, reservoir oil saturation, reservoir water saturation, reservoir thermal conductivity, and reservoir heat capacity, at a plurality of substantially evenly-dispersed locations throughout the reservoir or a portion of the reservoir;

(ii) creating a same or reduced-size first scalar model of said reservoir or a portion of said reservoir that is representative of that portion of the reservoir in terms of at least one or more of that portion of the reservoir's physical characteristics, comprising the steps of:

(a) transforming said physical data into printing instructions for a three dimensional printer to permit said printer to print a scaled, three dimensional scalar model representative of said reservoir or portion of said reservoir in said at least one physical characteristic; and (b) printing said first scalar model of said reservoir using said three dimensional printer so as to form said scalar model representative of said reservoir in said at least one physical characteristic.

(iii) creating a second scalar model identical to said first scalar model, using the sub-steps of step (ii) above;

(iv) conducting a first simulated oil recovery process on said first scalar model and measuring various oil recovery parameters;

(v) conducting a second different simulated oil recovery process on said second scalar model and measuring identical oil recovery parameters; and (v) comparing said measured oil recovery parameters with respect to said first oil recovery process with those obtained from said second oil recovery process.

More specifically, in a preferred embodiment of the method of the present invention such comprises a method of comparing the relative oil recovery characteristics of two different oil recovery techniques in regard to a single carbonate reservoir, comprising the steps of:

(i) acquiring physical data of said reservoir or portion of said reservoir as to it porosity at a single or plurality of substantially evenly-dispersed locations throughout the reservoir or a portion of the reservoir;

(ii) transforming said physical data into printing instructions for a three dimensional printer to permit said printer to print a same or reduced scale, three dimensional scalar model representative of said reservoir or portion of said reservoir in said at least one physical characteristic; and (iii) printing a first scalar model of said reservoir using said three dimensional printer, flooding the scalar model thereby created with a fluid so as to infuse said fluid into pores created in the scalar model.

(iv) printing a second scalar model of said reservoir using said three dimensional printer, and flooding the scalar model thereby created with a fluid so as to infuse said fluid into pores created in the scalar model.

(v) conducting a first simulated oil recovery process on said first scalar model and measuring various oil recovery parameters;

(vi) conducting a second different simulated oil recovery process on said second scalar model and measuring identical oil recovery parameters; and (vii) comparing said measured oil recovery parameters with respect to said first oil recovery process with those obtained from said second oil recovery process.

In a further embodiment, where the actual carbonate formation possesses water at various locations, each of above steps (iii) and (iv) comprise the further step of displacing fluid in said scalar model with saline water at one or more locations to mimic initial water in place in said reservoir.

BRIEF DESCRIPTION OF THE DRAWINGS

The accompanying drawings illustrate one or more exemplary embodiments of the present invention and are not to be construed as limiting the invention to these depicted embodiments.

DETAILED DESCRIPTION OF PREFERRED EMBODIMENTS

Figure 1:
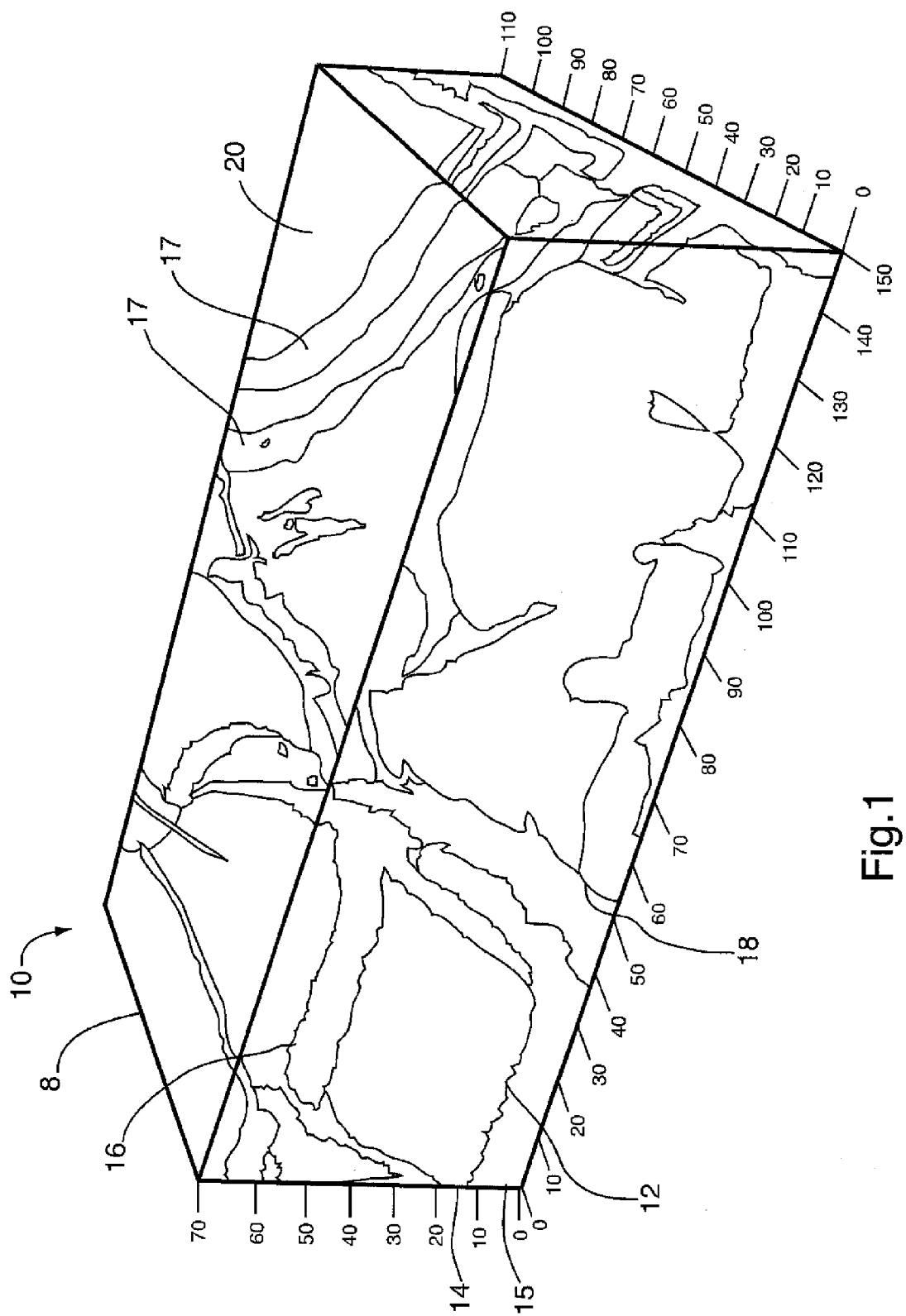
FIG. 1 shows a 3D perspective view of a portion of an hydrocarbon-containing formation, showing a hydrocarbon-containing layer within such formation and various additional carbonate layers each having different shading indicating different porosities throughout the formation.

FIG. 1 shows a 3D perspective view of a portion 8 of an hydrocarbon-containing formation (reservoir) 10, showing a hydrocarbon-containing layer 12 within such formation 10 and various additional carbonate layers 13, 14, 15, 16, which typically are of different composition, density, porosity, permeability and wetability, such different layers 13, 14, 15, 16 in FIG. 1 indicated by different shading.

While the entire formation may be of an undulating, irregular curvilinear shape, the portion 8 of formation 10 may, for analytic purposes, be of a prismatic shape, which in FIG. 1, for illustrative purposes, is of dimensions 150 m×110 m×70 m (length×width×depth). Such prismatic shape may be chosen for ease of dividing formation 10 into different smaller-sized portions 8.

As seen from FIG. 1, such formation 10 may possess various fracture fault lines 17, and also may possess various water-containing seams 18.

Data and information as to various physical characteristics of the portion 8 of reservoir 10, such as the reservoir porosity of the various layers 13, 14, 15, 16, the permeability and wetability of the various layers 13, 14, 15, 16, the reservoir geology in terms of its fracture lines and faults and water-containing seams 18, the reservoir oil saturation, the reservoir water saturation, the reservoir thermal conductivity, and for the reservoir heat capacity of the various layers 13, 14, 15, 16, may all be gathered by carrying out actual data gathering steps on the formation 10. Specifically, in a first method of gathering such information, various wells 20 may be drilled in a substantially evenly-dispersed manner throughout the portion 8 of formation 10, and core samples obtained and analyzed. Alternatively, gamma devices may be lowered downhole in each well, and data obtained therefrom at various vertical depths in the formation. Still further, alternatively such data and information as to the physical characteristics may be gathered by means of 3D seismic techniques, namely by placing seismic hydrophones (not shown) at various uniformly-dispersed locations on the surface 24 of reservoir 10 and conducting seismic surveys and recording the obtained data. Alternatively, 3D or 4D seismic techniques may be employed to obtain data and information as to such physical characteristics. Specifically, hydrophones (not shown) may be placed at various vertical spacing in individual vertical wells 20 which are drilled in uniformly spaced locations in formation 10. Thereafter, using vibrometers or explosive shots, one or more 3D or 4D seismic surveys may be carried out to obtain the desired data and information regarding one or more of the aforesaid physical characteristics of the formation 10. Alternatively, combinations of two or more of the preceding data recovery techniques may be carried out, to obtain such desired physical characteristic(s) of the formation 10 as to porosity of the various layers 13, 14, 15, 16, permeability and wetability of the various layers 13, 14, 15, 16, reservoir geology in terms of its fracture lines and faults and water-containing seams 18, reservoir oil saturation, reservoir water saturation, reservoir thermal conductivity, and for reservoir heat capacity of the various layers 13, 14, 15, 16.

Figure 2:
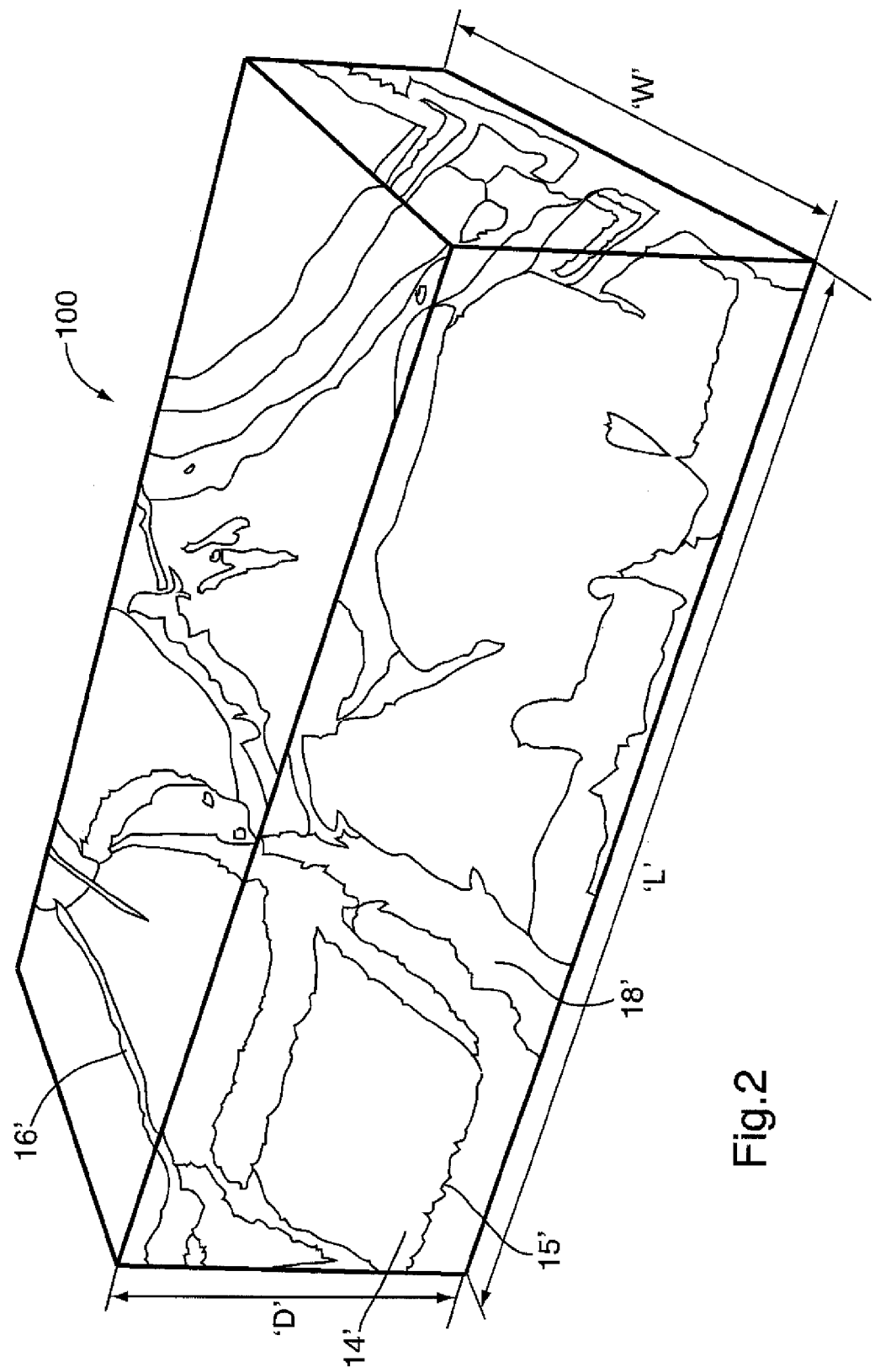
FIG. 2 is a perspective view of a 3D printed model of the reservoir of FIG. 1, of reduced dimensions L, W, and H, showing the a hydrocarbon-containing layer within such formation and various additional carbonate layers each having different shading indicating different porosities throughout the formation.

FIG. 2 shows a reduced-scale model 100 of the portion 8 of reservoir 10, printed by a 3D printer in accordance with the method of the present invention.

As shown in FIG. 2, the model 100 is a scaled representation of portion 8 of formation 10, with dimensions L, W, and D (length, width, and depth) being a scaled value (such as $1/10^{th}$) of the true dimensions of portion 8 of reservoir 10 shown in FIG. 1, in which case would then be $1/10$ of (150 m×110 m×70 m), namely 15 m×11 m×7 m, which results in a scaled volumetric reduction of $1/1000$ the true volume.

Importantly, scaled model 100 is further representative of portion 8 in respect of at least one further physical characteristic. In the embodiment shown in FIG. 2, such model 100 has been printed using a 3D printer, so as to provide identical representative reservoir geology of formation 10, including all fracture lines (lines of discontinuity between regions of different densities and porosities) and water-containing seams 18. In addition scalar model 100 is further made representative of such formation 10 as regards to its porosity, by applying binder to powder when printing scalar model 100 in such a manner to create interstitial voids within various layers 13', 14', 15', 16' of model 100, corresponding, albeit in reduced scale (by volume) to the porosity actually found in layers 13, 14, 15 in reservoir 10, as determined by core samples, 3D or 4D seismic obtained or performed using on reservoir 10 using any one or combination of the foregoing data recovery methods.

For example, for a printer resolution of a current state-of-the-art 3D printer may be in the order of 0.0001 inches (ie 0.000000254 m), or approximately $2 \times 10^{-7}$ m, namely 0.2 microns. Accordingly, the smallest pore size volume that can be printed by the 3D printer to achieve true proportional scalar representation is $(2 \times 10^{-7})^3$ m$^3$, namely $8 \times 10^{-21}$ m$^3$. Accordingly, if the smallest pore size in an actual formation, typically a carbonate formation, is 1 cubic micron (ie $1 \times 10^{-6})^3$ m$^3$, namely $1 \times 10^{-18}$ m$^3$, then the smallest scalar reduction of reservoir volume, if that reservoir is desired to be accurately modelled in the scalar model, can only be $8 \times 10^{-21}/1 \times 10^{-18}$, namely $1/125$ of true size.

Thus, for an actual reservoir 10 (or portion 8 of an actual reservoir 10) having dimensions of 100 m×40 m×15 m (namely length×width×depth), which depth is typical of oil sand deposits where the depth of the "pay" seam is only in the range of some 15-200 m and where the size of the smallest pore within such formation may be 1 cubic micron existing between rock or sand grains, the smallest size of the 3D printer that would be needed to print a representative reduced-size scalar model of such formation having representative interstitial voids proportional in volume to the pores (not shown) in formation 10 in each of various layers 13, 14, 15, & 16 would be a 3D printer capable of printing a representative model 100 having the following dimensions, namely 20 m×8 m×3 m, namely a volume $1/125$ that of the actual reservoir or portion thereof being modelled.

As the scaler model 100 is intended to be used for testing oil recovery techniques, and may in such process be subjected to heat, in a preferred embodiment the 3D printer uses a ceramic powder, which may be solidified after application of the binder via the ink-jet nozzles from the printer. If desired, and in a further embodiment, the ceramic scalar model may further be "fired" by exposing to heat to cure the ceramic into a solid ceramic scalar model 100 which may, like true oil formations existing in carbonaceous rock, be then subject to heat processes during various oil recovery techniques, and be capable of withstanding such heat processes. It is possible (but usually not preferable) that a series of oil various oil recovery techniques may be tested on a single scalar model, but usually, due to the various alternative drilling of horizontal recovery wells for the various oil recovery techniques, carrying out a single test on a scalar model will usually result in its destruction, or at least modification due to purity of wells within the formation, which depends on the method of recovery being tested, necessitating creation of one or more additional scalar models 100 by a 3D printer if additional comparative recovery techniques are desired to be further tested.

Figure 3:
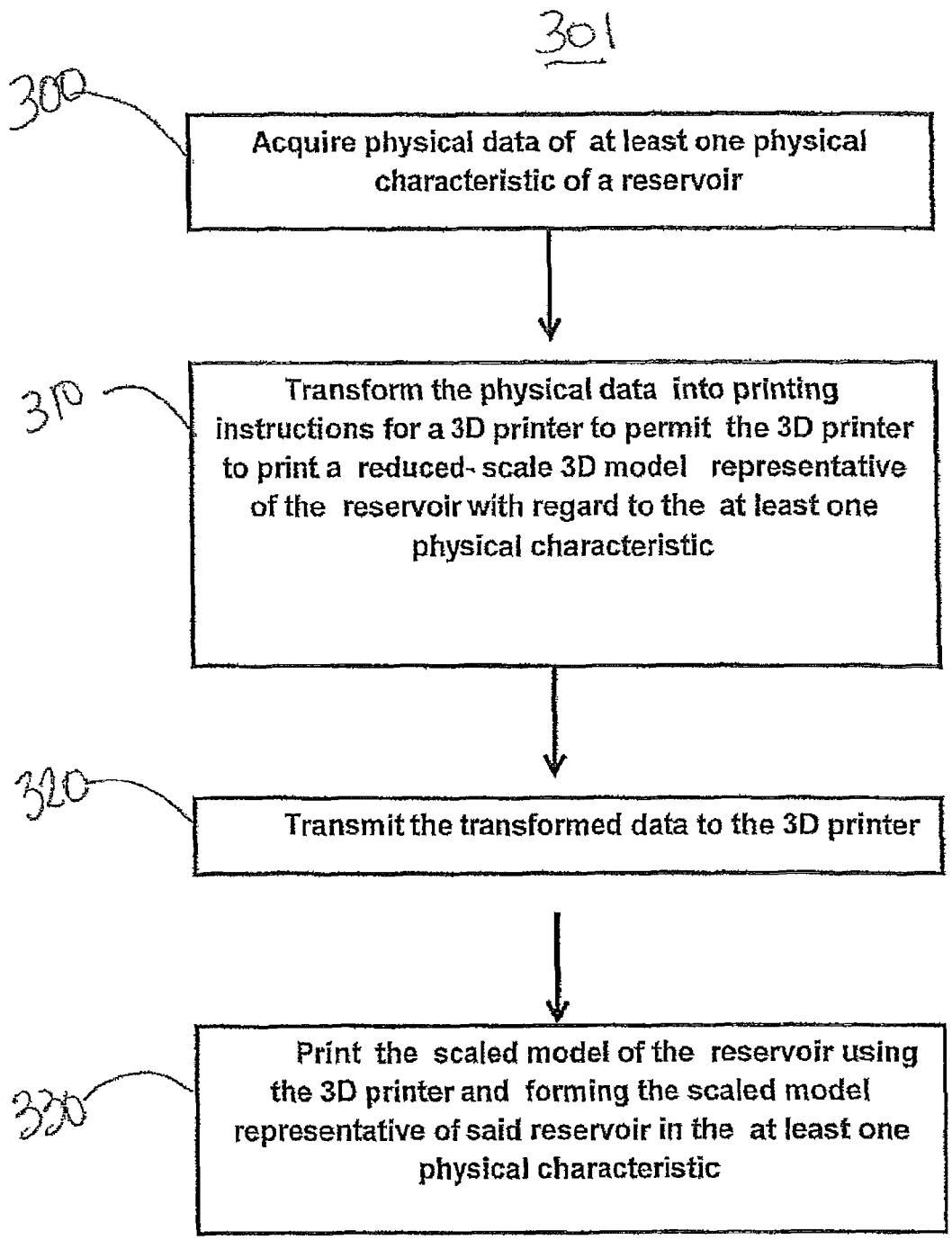
FIG. 3 is a flow diagram of various steps contained in a broad embodiment of the method of the present invention.

FIG. 3 shows a broad embodiment 301 of a method of the present invention for creating a representative 3D model of an oil reservoir representative of such reservoir in at least one physical characteristic.

In a first step 300, physical data of at least one physical characteristic of a reservoir 10 are obtained, using such methods as drilling core samples via vertical wells 20 uniformly throughout a formation 10, or by conducting 3D or 4D seismic surveys, or a combination of such methods.

Thereafter, in a second step 310 the obtained physical data is transformed into printing instructions for a 3D printer to permit the 3D printer to print a reduced-scale 3D model representative of the reservoir 10 (or portion 8 of reservoir 10) with regard to the one physical characteristic. For example, obtained physical reservoir porosity data for each of various layers 13, 14, 15, 16 in formation 10 may be created in a CAD file. Thereafter, the standard data interface between CAD software and the machines is the STL file format. An STL file approximates the shape of a part or assembly using triangular facets. Smaller facets produce a higher quality surface.

Alternatively, a VRML (or WRL) may be created from GIS data, which GIS data may be obtained from seismic surveys having relative positional information made part of such data, The VMRL file may then be used as printer input for a 3D printer. File formats for 3D printers often depend on the type of 3D modeling software used. A number of common formats are as follows: but there are many common formats, such as:

".stl"—STL is a file format for stereolithography CAD software created by 3D Systems;

.iges—The Initial Graphics Exchange Specification (IGES) is a neutral data format that allows the digital exchange of information among Computer-aided design (CAD) systems;

.obj—OBJ (or .OBJ) is a geometry definition file format first developed by Wavefront Technologies for its Advanced Visualizer animation package. The file format is open and has been adopted by other 3D graphics application vendors; and .3ds—3DS is one of the file formats used by the Autodesk 3ds Max 3D modelling, software.

In a third step 320, such transformed data is transmitted to the 3D printer;

Finally, in a fourth step 330, the 3D printer acts to print the scalar model 100, representative of portion 8 of formation 10 in the at least one physical characteristic, such as having interstitial spaces within various layers 13', 14', 15', 16', which are scalar representatives of pores (not shown) in various layers 13, 14, 15, 16 of portion 8 of reservoir 10.

Figure 4:
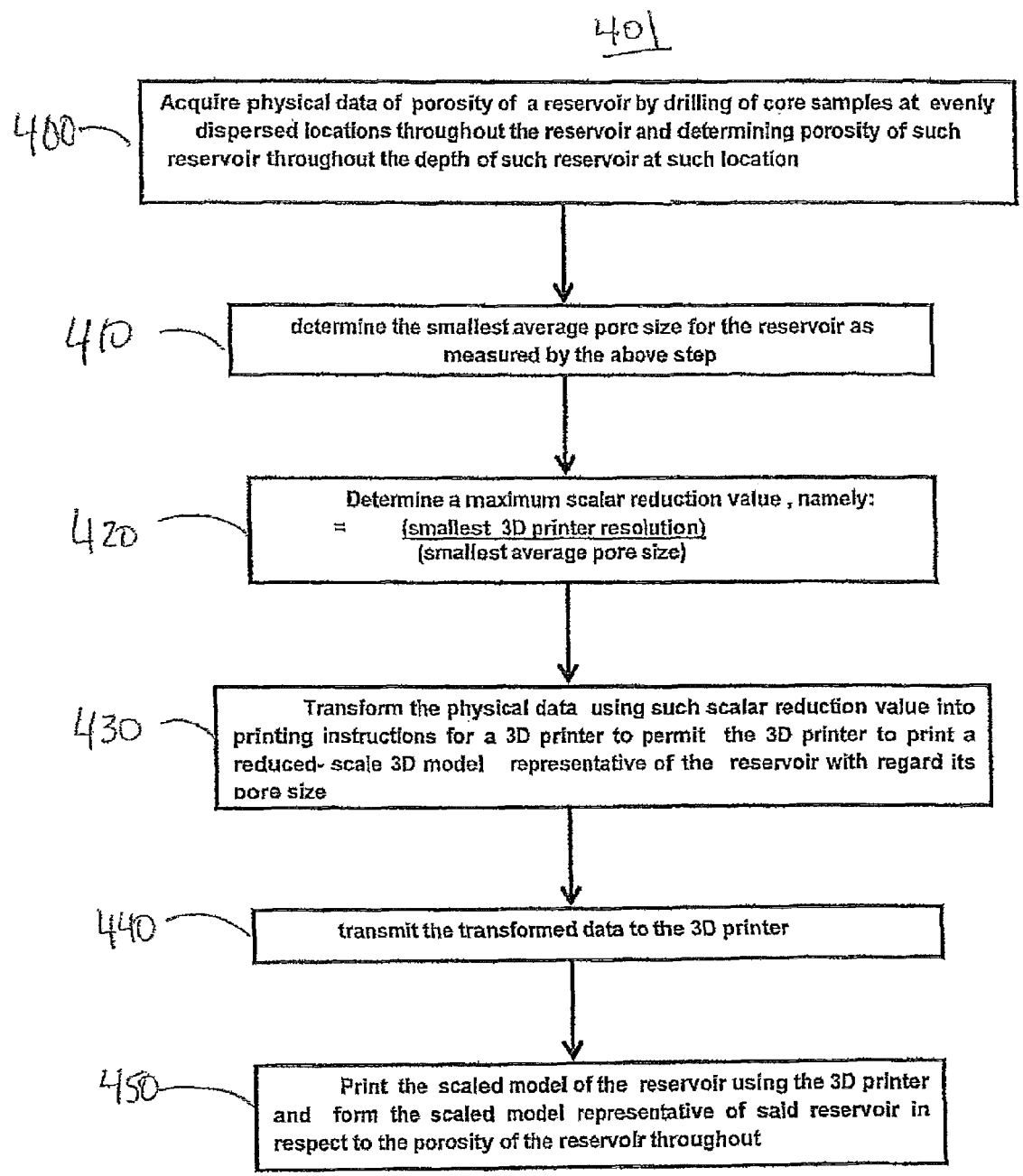
FIG. 4 is a flow diagram of various steps contained in a refinement of the method of the present invention which is shown in FIG. 3.

FIG. 4 depicts a refinement 401 of above broad method 310, for creating a proportional scalar model 100 of a portion 8 of a reservoir 10, which is representative of the porosity of the formation 10 throughout the formation 10, namely throughout each of layers 13, 14, 15, 16 of portion 8 of reservoir 10.

In a first step 400, physical data of porosity of a reservoir by drilling of vertical wells 20 and obtaining core samples at evenly dispersed locations throughout the reservoir and determining porosity of such reservoir throughout the depth of such reservoir at such location.

In a second step 410, the smallest average pore size for the portion 8 of reservoir 10 being modelled is determined. Such then allows the maximum scalar reduction of the portion 8 of reservoir 10 to be determined, and at step 420, such maximum scalar reduction is determined by the formula:

$$\text{scalar reduction} = \frac{\text{(smallest 3D printer resolution)}}{\text{(smallest average pore size)}}$$

In some instances, 3D printer resolution may be different in the x and y axis, as compared to the z axis. In such case the scalar reduction must be, in order to be a proportional reduction, limited to the axis which has the lowest (ie poorest) resolution capability. For example, if a printer has a resolution of 0.0001 inches in the z axis, and only 0.0002 inches in the x, y axis, the poorer resolution (namely the 0.0002 inch resolution) need be used in the above calculation in order to obtain a true scalar three dimensional model 100 which is accurately representative of the porosity.

Thereafter third, fourth, and fifth steps 430, 440, and 450 identically correspond respectively to steps 310, 320, and 330, so as to result in a 3D representative model 100 which is accurately representative of the porosity of portion 8 of formation 10, which can then be used for performing testing of migration of a fluid representative of oil, and thus allow testing of a method to recover oil within an actual formation 10.

Figure 5:
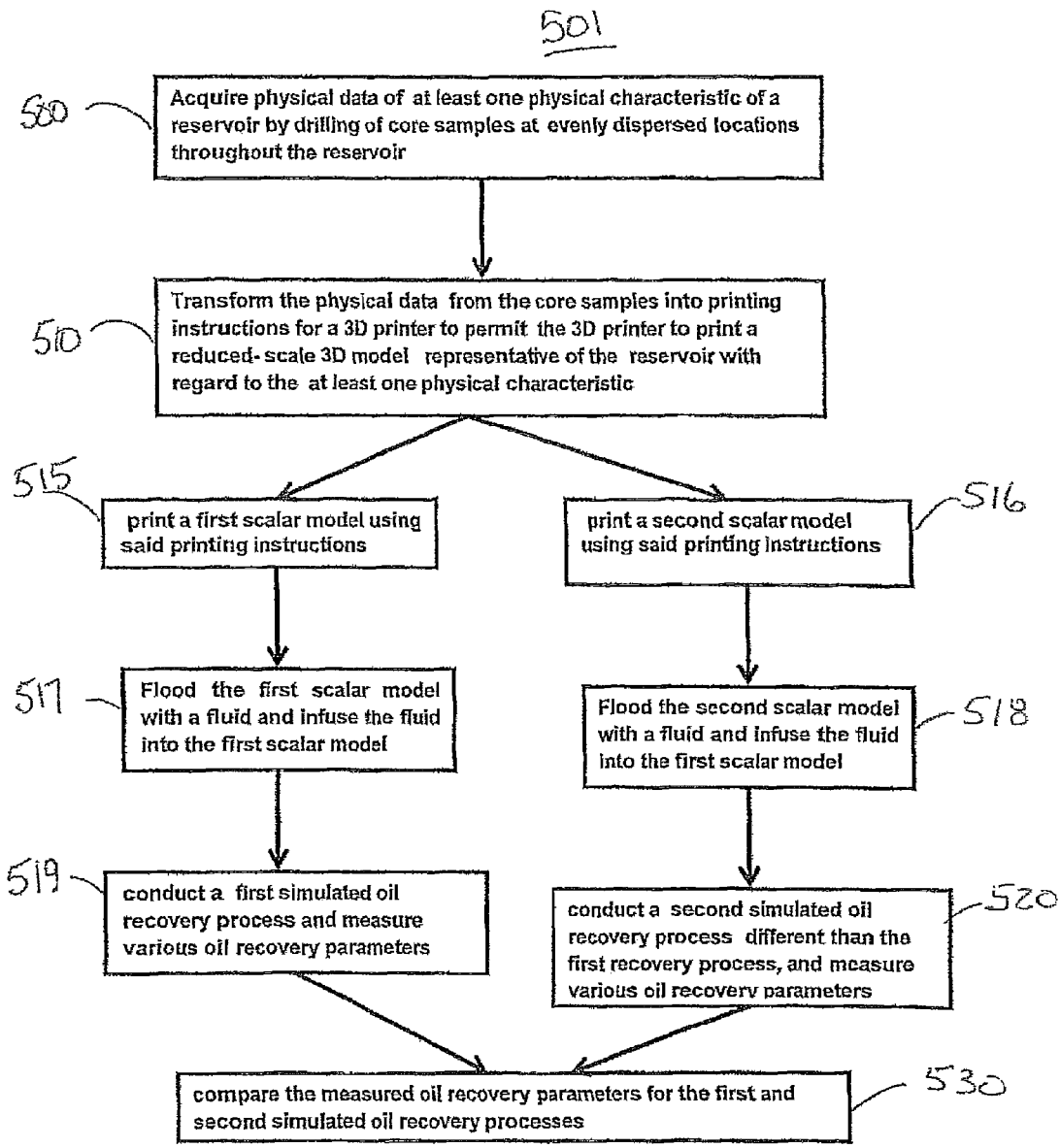
FIG. 5 shows a flow diagram of the various steps contained a method of comparative testing of different hydrocarbon recovery techniques on a single hydrocarbon-containing reservoir.

Specifically, FIG. 5 shows a particular embodiment 501 of the method of the present invention which provides for creation of a two representative scalar models for comparative testing of various oil recovery techniques for a particular reservoir having modelled physical characteristics of reservoir porosity, reservoir heterogeneities, reservoir wetability, reservoir permeability, reservoir geology in terms of its fracture lines and faults, reservoir fluid saturation, reservoir thermal conductivity, and reservoir heat capacity.

In a first step 500, physical data of porosity of a reservoir by drilling of vertical wells 20 and obtaining core samples at evenly dispersed locations throughout the portion 8 of reservoir 10 and determining porosity throughout the depth of such reservoir at such locations. Smoothing of such data over the entirety of the portion 8 may be conducted, to provide for values at any and all locations within portion 8 of reservoir 10.

Thereafter, in step 510, the physical data from the core samples into printing instructions for a 3D printer to permit the 3D printer to print, in steps 515 and 516, respectively, a first and second, identical reduced-scale 3D model 100 representative of portion 8 of reservoir 10 with regard to the physical characteristics of reservoir porosity/permeability, and reservoir geology in terms of its fracture lines and faults 17.

Thereafter, in steps 517 and 518, respectively, each of first and second scalar models are flooded with a fluid, and such fluid infused into each of the first and second scalar models 100, to an extent corresponding to the reservoir 10 fluid saturations per unit volume throughout portion 8 of reservoir 10. This step accordingly allows emulation (modelling) of the physical characteristic of reservoir fluid saturation of a reservoir 10, in addition to the modelling of reservoir porosity, reservoir permeability, and reservoir geology in terms of its fracture lines and faults 17.

Thereafter, in steps 519 and 520, respectively, a different oil recovery method may be practiced on each of first and second scalar models 100, and various (identical) fluid recovery parameters measured in respect of each method, which are representative of oil recovery rates in actual formation 10, at least as regards to a formation having the physical characteristics of reservoir porosity, reservoir permeability, reservoir geology in terms of its fracture lines and faults, reservoir oil saturation, and reservoir water saturation.

Thereafter, in step 530, the measured fluid recovery parameters for each of the two tests may be compared, thereby giving an indication as to how such two oil recovery techniques would perform if conducted in real life on formation 10

Figure 6:
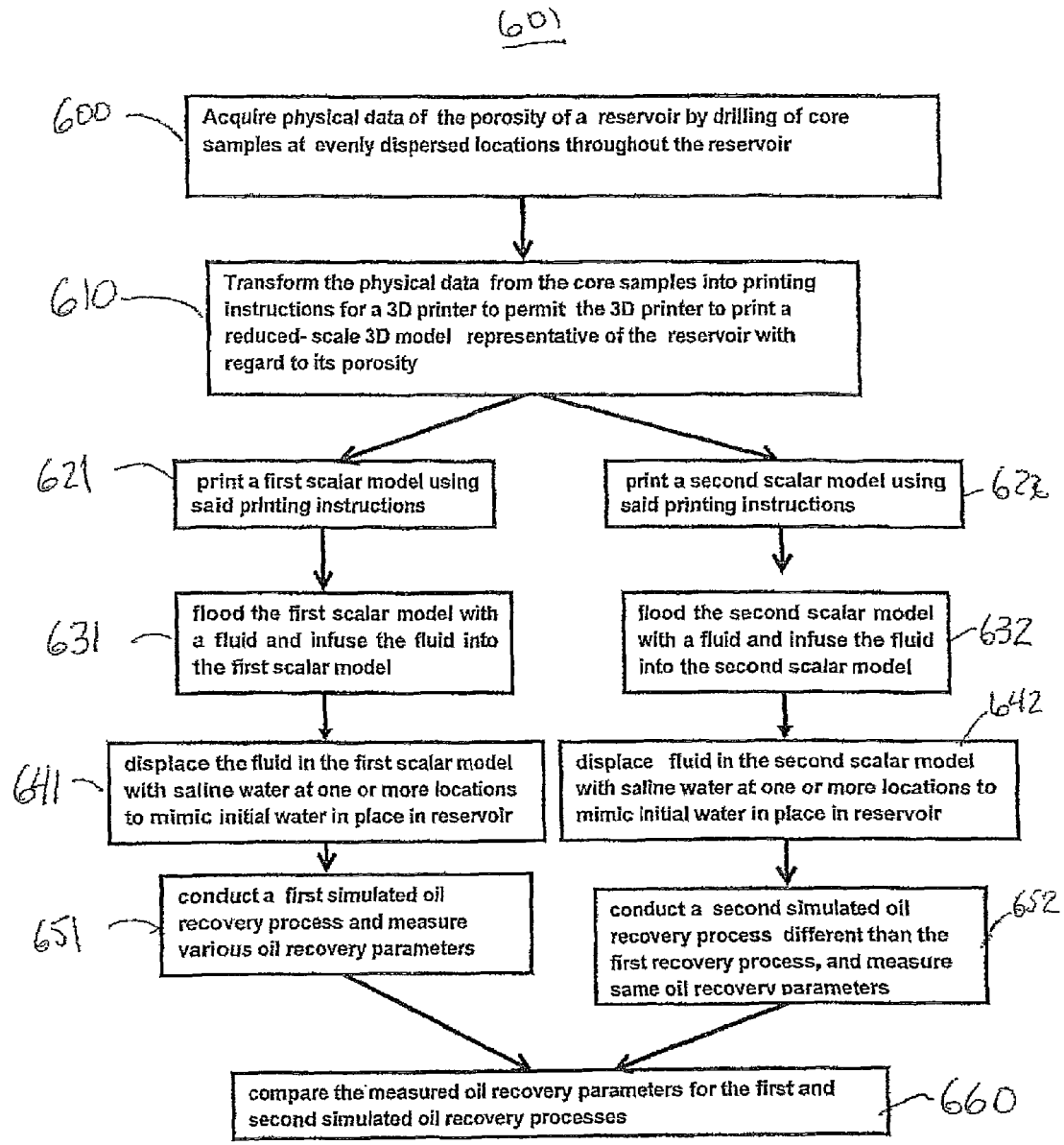
FIG. 6 shows a flow diagram of a refinement of the method shown in FIG. 5, wherein two different hydrocarbon recovery techniques may be compared on a single hydrocarbon-containing reservoir having representative porosity of an actual hydrocarbon reservoir, where such reservoir contains amounts of water.

FIG. 6 represents a refinement of the method of FIG. 5, and is particularly adapted for modelling a reservoir 10 where the portion 8 of reservoir 10 contains water-bearing seams 18, or a portion of such formation 10 is flooded with water. Specifically, the method of FIG. 6 allows 3D modelling of all of the following physical characteristics of a reservoir 10, namely not only reservoir porosity, reservoir permeability, reservoir geology in terms of its fracture lines and faults, but further at the same time the additional physical characteristics of reservoir oil saturation and reservoir water saturation. The method of FIG. 6 thus permits comparison of two oil recovery techniques on a formation having each of these modelled parameters.

In such method 601, steps 600, 610, 621, 622 correspond to steps 500, 510, 515, and 516 respectively of FIG. 5.

In steps 631 and 632, each of the created first and second 3D models are flooded with oil, and infused into pores in the formation to an extent to represent and correspond to the level of oil saturation at various locations in the actual portion 8 of formation 10. The order in which the model is flooded with fluids may vary with the various reservoirs to be modelled.

Thereafter, in steps 641, 642 respectively the fluid in the respective first and second scaler models 100 is displaced with saline water at one or more locations to mimic initial water in place in the portion 8 of reservoir 10.

Thereafter, in steps 651 and 652 respectively, two different oil recovery methods may be tested on the created first and second scalar models 100 respectively, and various fluid recovery parameters recorded for each method.

Thereafter, in step 660, the measured oil recovery parameters of each of the oil recovery techniques may then be compared, to determine the more suitable oil recovery technique for that particular formation, and in particular in regard to a formation that has water in various water-bearing seams 18, or is infused in the formation 10.

The above disclosure represents embodiments of the invention recited in the claims.

The scope of the claims should not be limited by the preferred embodiments set forth in in the foregoing examples, but should be given the broadest interpretation consistent with the description as a whole, and the claims are not to be limited to the preferred or exemplified embodiments of the invention.

The invention claimed is:

1. A method of creating a same scale or reduced-size scalar model of a reservoir or a portion of such reservoir that is representative of at least one or more of that reservoir's physical characteristics, comprising the steps of:
   (i) acquiring physical data of said reservoir or portion of said reservoir as to one or more physical characteristics of said reservoir at a plurality of substantially evenly-dispersed locations throughout the reservoir or a portion of the reservoir;
   (ii) transforming said physical data into printing instructions for a three dimensional printer to permit said printer to print a reduced-scale, three dimensional scalar model representative of said reservoir or portion of said reservoir in said at least one physical characteristic; and
   (iii) printing said scalar model of said reservoir using said three dimensional printer so as to form said scalar model representative of said reservoir in said at least one physical characteristic;
   and further comprising the subsequent steps of:
   (iv) flooding the thereby created scalar model with a fluid, and infusing said fluid into pores created in the scalar model.

2. The method of creating a scalar model of a reservoir as claimed in claim 1, wherein said scalar model when flooded with fluid is subject to pressure to better and more quickly infuse said fluid into said pores in said scalar model.

3. The method of creating a scalar model of a reservoir as claimed in claim 1, wherein said fluid is oil.

4. The method of creating a scalar model of a reservoir as claimed in claim 1, wherein said fluid in said scalar model is displaced with saline water at one or more locations to mimic initial water in place in said reservoir.

5. The method of creating a scalar model of a reservoir as claimed in claim 2, wherein said fluid in said scalar model is displaced with saline water at one or more locations to mimic initial water in place in said reservoir.

6. The method of creating a scalar model of a reservoir as claimed in claim 3, wherein said fluid in said scalar model is displaced with saline water at one or more locations to mimic initial water in place in said reservoir.

7. The method of creating a scalar model of a reservoir as claimed in claim 1, 2, or 3, where said fluid in said scalar model is saline water, further comprising the step of displacing said saline water with oil to mimic initial water and oil in place in said reservoir.

8. A method of comparative testing of different techniques of oil recovery from a hydrocarbon-containing reservoir, comprising the steps of:
   (i) acquiring physical data of said reservoir or portion of said reservoir as to one or more physical characteristics at a single or plurality of substantially evenly-dispersed locations throughout the reservoir or a portion of the reservoir;
   (ii) creating a reduced-size first scalar model of said reservoir or a portion of said reservoir that is representative of that portion of the reservoir in terms of at least one or more of that portion of the reservoir's physical characteristics, comprising the steps of:
      (a) transforming said physical data into printing instructions for a three dimensional printer to permit said printer to print a reduced scale, three dimensional scalar model representative of said reservoir or portion of said reservoir in said at least one physical characteristic; and
      (b) printing said first scalar model of said reservoir using said three dimensional printer so as to form said scalar model representative of said reservoir in said at least one physical characteristic;
   (iii) creating a second scalar model identical to said first scalar model, using the sub-steps of step (ii) above;
   (iv) conducting a first simulated oil recovery process on said first scalar model and measuring various oil recovery parameters;
   (v) conducting a second different simulated oil recovery process on said second scalar model and measuring identical oil recovery parameters; and
   (vi) comparing said measured oil recovery parameters with respect to said first oil recovery process with those obtained from said second oil recovery process.

9. The method of comparative testing of different techniques of oil recovery from a hydrocarbon-containing reservoir as claimed in claim 8, wherein said step of acquiring physical data of said reservoir of portion of said reservoir as to one or more physical characteristics of said reservoir comprises acquiring physical data as to physical characteristics selected from the group of reservoir physical characteristics consisting of reservoir porosity, reservoir wettability, reservoir heterogeneities, reservoir permeability, reservoir geology in terms of its fracture lines and faults, reservoir fluid saturation, reservoir thermal conductivity, and reservoir heat capacity.

10. A method of comparing the relative oil recovery characteristics of two different oil recovery techniques, comprising the steps of:
   (i) acquiring physical data of said reservoir or portion of said reservoir as to it porosity at a single or plurality of substantially evenly-dispersed locations throughout the reservoir or a portion of the reservoir;
   (ii) transforming said physical data into printing instructions for a three dimensional printer to permit said printer to print a reduced scale, three dimensional scalar model representative of said reservoir or portion of said reservoir in said at least one physical characteristic; and
   (iii) printing a first scalar model of said reservoir using said three dimensional printer, flooding the scalar model thereby created with a fluid so as to infuse said fluid into pores created in the scalar model;
   (iv) printing a second scalar model of said reservoir using said three dimensional printer, and flooding the scalar model thereby created with a fluid so as to infuse said fluid into pores created in the scalar model;
   (v) conducting a first simulated oil recovery process on said first scalar model and measuring various oil recovery parameters;

(vi) conducting a second different simulated oil recovery process on said second scalar model and measuring identical oil recovery parameters; and (vii) comparing said measured oil recovery parameters with respect to said first oil recovery process with those obtained from said second oil recovery process.

11. The method of comparing the relative oil recovery characteristics of two different oil recovery techniques as claimed in claim 10, wherein said physical characteristics are selected from the group of reservoir physical characteristics consisting of reservoir porosity, reservoir heterogeneities, reservoir wettability, reservoir permeability, reservoir geology in terms of its fracture lines and faults, reservoir fluid saturations, reservoir thermal conductivity, and reservoir heat capacity.

12. The method of comparing the relative oil recovery characteristics of two different oil recovery techniques as claimed in claim 11, wherein each of steps (iii) and (iv) comprise the further step of displacing fluid in said scalar model with saline water at one or more locations to mimic initial water in place in said reservoir.

13. The method of comparing the relative oil recovery characteristics of two different recovery techniques as claimed in claim 11, wherein each of steps (iii) and (iv) comprise the further step of displacing fluid in said scalar model, where said fluid is saline water, with oil or a fluid representative of oil, at one or more locations to mimic initial water and oil in place in said reservoir.

\* \* \* \* \*